(12) United States Patent
Wrobel

(10) Patent No.: US 9,774,545 B2
(45) Date of Patent: Sep. 26, 2017

(54) METHOD OF OPERATING A NETWORK ACCORDING TO MMRP STANDARD

(71) Applicant: Hirschmann Automation and Control GmbH

(72) Inventor: Christoph Wrobel, Schwaebisch Gmuend (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 349 days.

(21) Appl. No.: 14/598,354

(22) Filed: Jan. 16, 2015

(65) Prior Publication Data

US 2015/0207761 A1 Jul. 23, 2015

(30) Foreign Application Priority Data

Jan. 17, 2014 (DE) .................. 10 2014 200 817

(51) Int. Cl.
*H04L 12/931* (2013.01)
*H04L 12/741* (2013.01)

(52) U.S. Cl.
CPC ............ *H04L 49/201* (2013.01); *H04L 45/74* (2013.01)

(58) Field of Classification Search
CPC ... H04L 49/201; H04L 49/351; H04L 49/354; H04L 49/602; H04L 45/74; H04L 45/245; H04L 12/4641; H04L 12/467; H04L 12/4691; H04L 12/1687; H04L 47/10; H04L 47/125; H04L 47/2458; H04L 69/14; H04L 29/12028; H04L 61/103; H04L 65/4076
See application file for complete search history.

(56) References Cited

U.S. PATENT DOCUMENTS 6,785,294 B1* 8/2004 Ammitzbøll et al. .............. H04L 12/185 370/392

* cited by examiner

*Primary Examiner* — Ian N Moore
*Assistant Examiner* — Brian T Le
(74) *Attorney, Agent, or Firm* — Andrew Wilford

(57) ABSTRACT

A method for operating a network having a plurality of terminals and a plurality of switches connected to one another via data lines has the first step of transmitting a multicast MMRP data packet from a data source via at least one of the switches and one of the data lines to a predetermined terminal intended to receive the multicast data packet. Then one port of a switch to which is connected another terminal that is not MMRP-capable is fed the multicast address as a static entry of the terminal connected to the one port. The multicast address is then transmitted to the at least one switch connected thereto.

3 Claims, 1 Drawing Sheet

METHOD OF OPERATING A NETWORK ACCORDING TO MMRP STANDARD

FIELD OF THE INVENTION

The present invention relates to an MMRP network. More particularly this invention concerns a method of operating such a network.

BACKGROUND OF THE INVENTION

Figure 1:
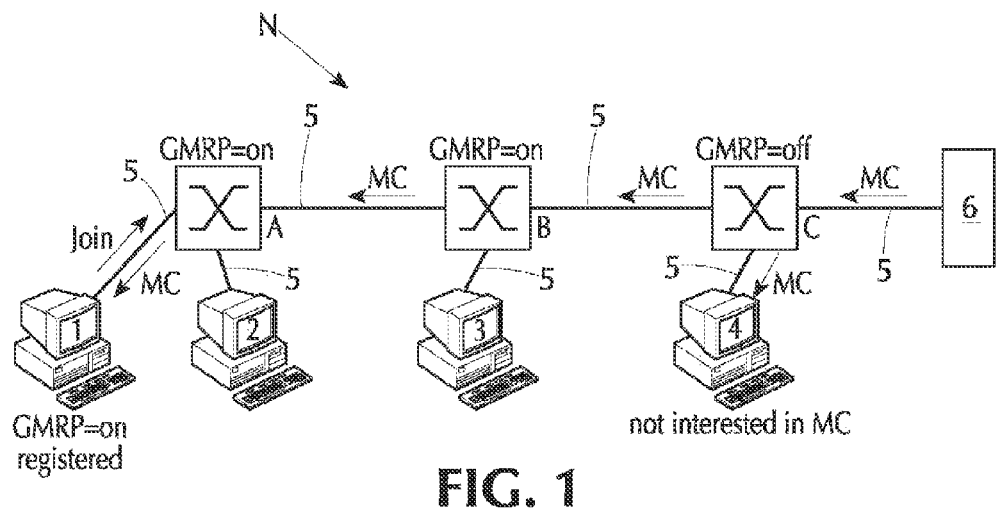
FIG. 1 is a schematic diagram of a network according to the invention.

In a network with a plurality of terminals and a plurality of switches connected to one another via data lines, a multicast data packet is transmitted according to the MMRP protocol from one data source via at least one switch and at least one of the data lines to a predetermined terminal intended to receive the multicast data packet.

In contract, a unicast packet is a data packet addressed to a single predetermined terminal and relayed by switches thereto in a targeted manner. Multicast packets are data packets relayed to a plurality of receivers within a network. A switch according to standard IEEE 802.1D in the basic setting always relays multicasts to all ports of the switches, but not to the ports of those terminals that have already received the packet. Therefore, such packets are also relayed into regions of a network where they only senselessly consume the available bandwidth.

The multiple MAC registration protocol (MMRP) and its precursor GMRP (GARP multicast registration protocol) are used to relay multicast packets in a targeted manner only to those terminals that are of interest for its data stream or for which they are intended so as not to waste bandwidth in other regions of the network. This is optimal as long as all terminals support the MMRP protocol or the GMRP protocol. Hereafter, only "MMRP" is used, but applies also to GMRP (or vice versa, also with respect to the illustrations in the drawing).

In industrial networks, terminals often are and will be used that do not support MMRP. As a result, they cannot register for a specific multicast stream in the case of MMRP-activated switches and therefore also do not receive the multicast stream related thereto.

If no terminal is registered for a multicast, the switch behaves as if MMRP were deactivated or not present. It thus relays incoming multicasts to all other ports. However, this state is not of further interest and is only mentioned here for the sake of completeness.

Thus, if a terminal in an MMRP environment does not support the MMRP standard (computer 2 in FIG. 1 as an example), there are then two possibilities so that this terminal can receive a specific multicast stream:

Possibility 1:

The port of the switch to which the non-MMRP-capable terminal is connected must receive a static entry for this multicast. This is also true for the port of the following switch, to which the first switch is connected. This continues up to the source of the multicast.

Figure 2:
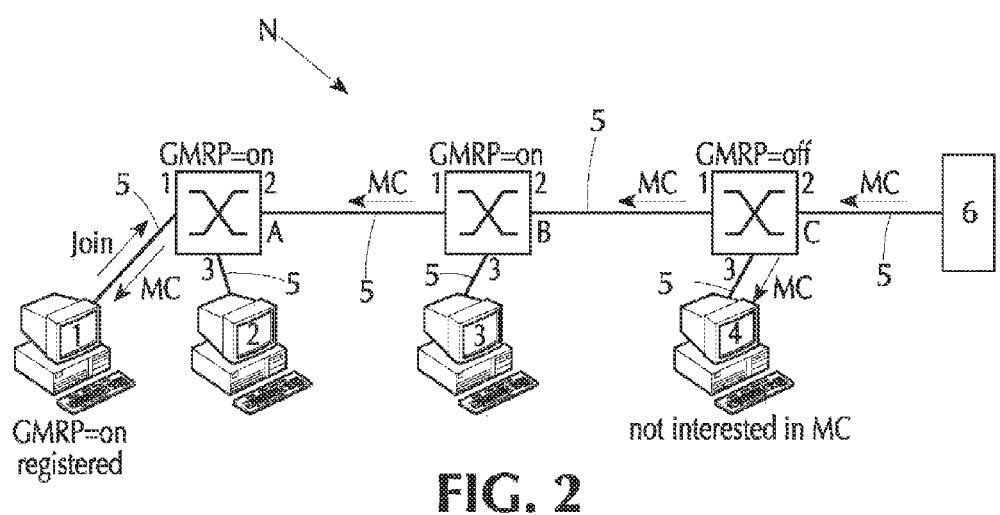
FIG. 2 is a view like FIG. 1 of another network according to the invention.

This means, when considering FIG. 2, that the port 3 must be statically configured by switch A, and also the port 1 must be statically configured by switch B.

Disadvantages of possibility 1:

Every switch between the sender and receiver must be configured. Switches introduced later (that were placed in the network newly or after a replacement, for example) also cannot be forgotten. This is very susceptible to error.

These configurations are static. If the multicast is no longer used, the affected switches must be reconfigured again.

The more different multicasts are required, the more complex the configurations.

Possibility 2:

At the port to which the terminal is connected, and at all further "input ports", "forward all" can be set. All multicasts are then relayed to the terminal. This terminal would guide the multicast control ad absurdum.

Disadvantages of possibility 2:

Multicasts that are not required are relayed uselessly consume the bandwidth of the terminal and unnecessarily load the terminal CPU.

The entry is static on all terminals between sender and receiver, as in possibility 1. Changes correspondingly ensure greater effort in the configuration.

OBJECTS OF THE INVENTION

It is therefore an object of the present invention to provide an improved method of operating a network according to the MMRP standard.

Another object is the provision of such an improved method of operating a network according to the MMRP standard that overcomes the above-given disadvantages, in particular that avoids the disadvantages described above and correspondingly improves the operating method a network that uses MMRP for data transmission.

SUMMARY OF THE INVENTION

A method for operating a network having a plurality of terminals and a plurality of switches connected to one another via data lines. The method has according to the invention the steps of transmitting a multicast MMRP data packet from a data source via at least one of the switches and one of the data lines to a predetermined terminal intended to receive the multicast data packet, entering at one port of a switch to which is connected another terminal that is not MMRP-capable the multicast address as a static entry of the terminal connected to the one port, and transmitting the multicast address to the at least one switch connected thereto.

In other words, provided according to the invention that a terminal that is not MMRP-capable is connected to one port of a switch, and the multicast address is entered as a static entry of this terminal at this port of this switch and this switch transmits this multicast address to the at least one switch connected thereto. It is thus advantageously possible that non-MMRP-capable terminals can be operated in a network that uses the MMRP protocol for data processing and data relay. The effort for incorporating non-MMRP-capable terminals into an MMRP environment is therefore minimal and free of incorrect configurations. Specifically, only the one port of the switch to which this non-MMRP-capable terminal is connected needs to be configured. On the one hand, this reduces the effort for the configuration very substantially and this ensures, on the other hand, that later expansions in the network between the sender (data source) and the receiver (terminal) do not represent a problem. Therefore, configurations, in particular newly configured configurations, changed configurations, or erasures of configurations, can advantageously no longer be forgotten.

Overall, the solution according to the invention thus offers the capability of incorporating non-MMRP-capable terminals of any kind into a network and operating them in this network that uses MMRP for data relay and data processing.

At the port to which the terminal is connected, the multicast address is entered and the switch then dynamically reports, i.e. in place of the terminal, this multicast to the following switch (transmits a join packet) that in turn—and this is the normal MMRP behavior—relays the registration to the next switch. This means that a static entry only exists at the switch to which the terminal is connected.

If the multicast is no longer required at the terminal, the static entry is then erased at the first switch, whereupon the switch sends a leave packet to the following switch, that therefore erases the dynamic entry and in turn sends a leave to the sender.

Incorporating a non-MMRP-capable terminal into an MMRP environment is thus relatively easy. Only the one port to which the terminal is connected must still be configured. This substantially reduces the effort and ensures that later expansions in the network between sender and receiver also do not represent a problem. Therefore, configurations cannot be forgotten.

In a refinement of the invention, the switch to which the non-MMRP-capable terminal is connected transmits this multicast address in place of the terminal to the remaining switches up to the data source.

In a refinement of the invention, when the static entry is no longer required, this static entry is erased at the switch to which the non-MMRP-capable terminal is connected, and this switch transmits a data packet representing the erasure to the at least one switch connected thereto.

In another refinement of the invention, this switch, to which the non-MMRP-capable terminal is connected, transmits this data packet representing the erasure in place of the terminal to the remaining switches up to the data source.

SPECIFIC DESCRIPTION OF THE INVENTION

As seen in FIGS. 1 and 2, as shown in detail, a network N has terminals 1 to 4 that are connected via data lines 5 to switches A, B, and C. The switches A, B, and C are also in turn connected to one another via data lines 5. In addition, a data source 6, is shown that can be a terminal, a switch, or another type of data source. A data packet, here a multicast data packet MC, is introduced into the network from the data source 6 via the data lines 5 and the switches A, B, and/or C. While the transmission direction of the multicast data packets MC is indicated using the arrows for the explanation of the method according to the invention, of course, these data packets can also be transmitted in the other direction via the data lines 5, for example, from a terminal toward the data source 6.

In FIG. 1, MMRP (GMRP) is turned off or is not present at the switch C. The terminal 4 receives the multicast stream, although it does not need it. Therefore, this terminal must erase the multicast. This can uselessly consume CPU power, in any case, other data packets directed to terminal 4 will be impeded.

JOIN is the registration for the multicast packets. An MMRP switch that has not received a registration at an arbitrary port relays multicast packets to all ports, except for the one at which the multicast was received. If the MMRP switch receives a registration packet at a port (also referred to as a registration packet, as JOIN), this switch then relays the corresponding multicast packets, for which the JOIN-transmitting terminal has registered, only to the port at which the JOIN was received. If an MMRP-capable terminal has already registered at a switch, a non-MMRP-capable device then no longer receives the multicast packets for which the other device has registered.

In addition, it is to be noted that the type of the illustrated network N in FIGS. 1 and 2 is only an example. The topology of the network N can also be a ring topology, further interconnected networks, and combinations of ring and line topologies. In addition, the number of terminals and the number of switches are only examples, so that fewer or more than four terminals (generally more than four terminals) and more or fewer than three switches (generally more than three switches) can also be present in the network N. In addition, it is to be noted that the switches can have an arbitrary number of ports, to which in turn further switches and/or further terminals can be connected. While the terminals 1 to 4 are shown as personal computers in FIGS. 1 and 2, these terminals can also be other types of terminals, in particular also different terminals.

I claim:

1. A method for operating a network having terminals and switches connected to one another via data lines, the method comprising the steps of:

transmitting a multicast multiple MAC registration protocol (MMRP) data packet from a data source via at least one of the switches and one of the data lines to a predetermined one of the terminals intended to receive the multicast MMRP data packet;

entering at one port of one of the switches to which is connected another one of the terminals that is not MMRP-capable a multicast address as a static entry of the other non-MMRP-capable terminal connected to the one port;

transmitting the multicast address to the at least one switch connected thereto; and when the static entry is no longer needed:

erasing the static entry at the switch to which the other non-MMRP-capable terminal is connected, and then transmitting from the one switch to which the other non-MMRP-capable terminal is connected a data packet representing the erasure to the at least one switch connected thereto.

2. The method defined in claim 1, further comprising the step of:

transmitting with the other non-MMRP-capable terminal the multicast address in place of the other non-MMRP-capable terminal to others of the switches up to the data source.

3. The method defined in claim 1, further comprising the step of:

transmitting from the one switch to which the other non-MMRP-capable terminal is connected the data packet representing the erasure to the remaining switches up to the data source.

* * * * *